Nov. 13, 1923.
A. O. HUBBARD
CLOTHES WRINGER FRAME
Filed May 22, 1920
1,473,769
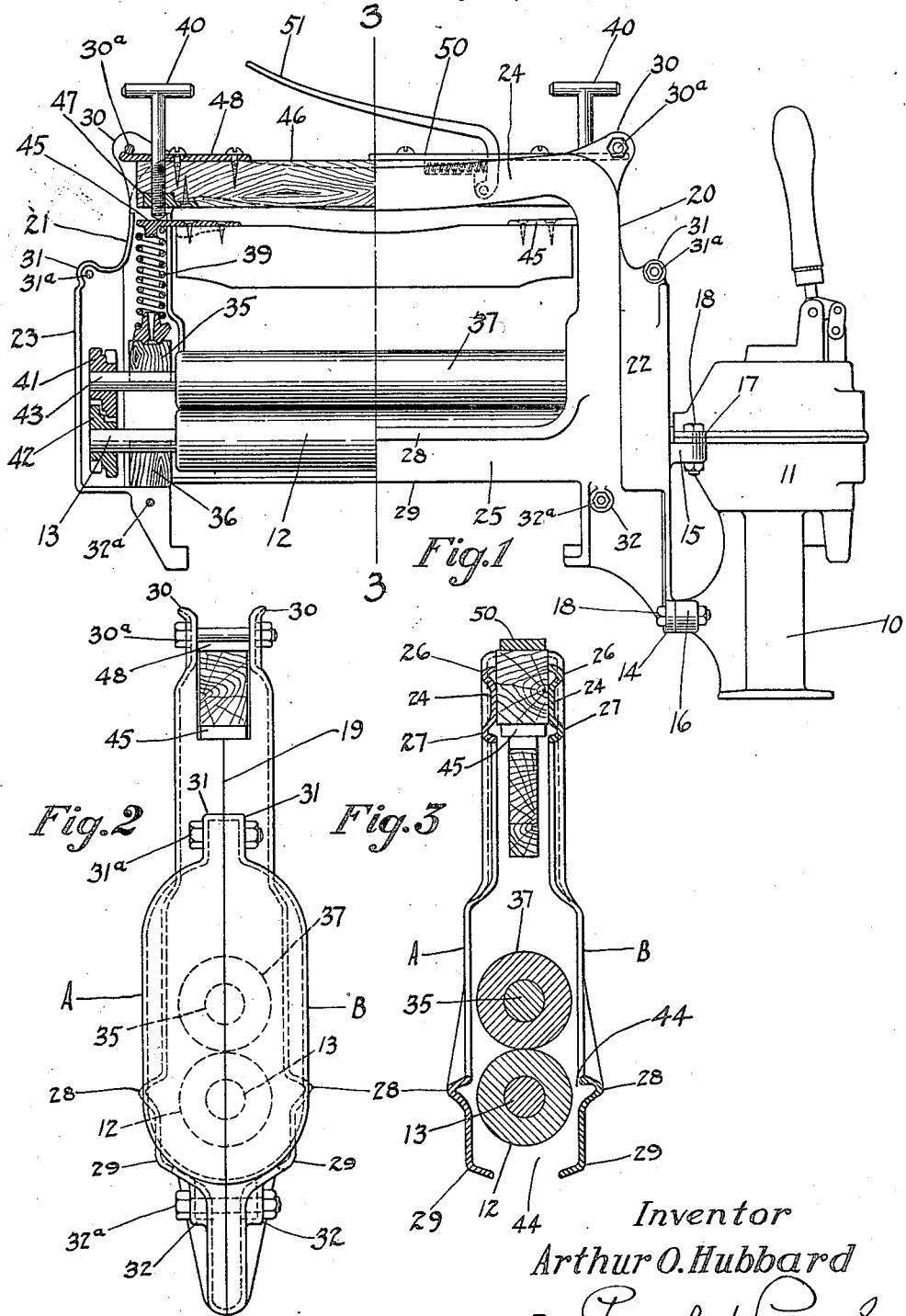
Inventor
Arthur O. Hubbard
By Paul Paul
His Attorneys Patented Nov. 13, 1923.

1,473,769

UNITED STATES PATENT OFFICE.

ARTHUR O. HUBBARD, OF MINNEAPOLIS, MINNESOTA.

CLOTHES-WRINGER FRAME.

Application filed May 22, 1920. Serial No. 383,442.

*To all whom it may concern:*

Be it known that I, ARTHUR O. HUBBARD, a citizen of the United States, resident of Minneapolis, county of Hennepin, State of Minnesota, have invented certain new and useful Improvements in Clothes-Wringer Frames, of which the following is a specification.

The object of my invention is to provide a simple rigid wringer frame which will avoid the usual construction of a number of frame parts, pieced together at both ends of the frame and which will also dispense with the use of wood for the frame and thereby insure its permanent rigidity and eliminate the danger of loosening and warping, the possibility of binding of the rolls in their bearings and the consequent difficulty in the operation of the machine.

A further object is to provide a light, rigid two piece frame which may be cast, formed or pressed out of metal and be simple of construction, inexpensive to maunfacture and which will present a smooth exterior surface and may be subjected to contact with wet clothes or hot water without damage.

Other objects of the invention will appear from the following detailed description.

In the accompanying drawings forming part of this specification,

Figure 1 is a side elevation, partially in section, of a metal frame wringer embodying my invention, Figure 2 is an end view of the same, Figure 3 is a vertical sectional view on the line 3—3 of Figure 1.

In carrying out my invention I provide two metallic side frame sections A and B bolted together to form a single unit in which are cast, formed or pressed, housings for the bearings, springs, gears, and other parts, and lugs for securing the sections together and for fastening the wringer frame to parts of a washing machine. In the drawings 10 represents a bracket of a washing machine, which preferably incorporates a gear casing 11 from which the lower wringer roll 12 having the shaft 13 may be driven in any suitable manner. Suitable drilled lugs 14 and 15 are formed in the frame sections A and B at appropriate points to coincide with lugs 16 and 17 on the brackets 10 for the reception of fastening bolts 18. The frame sections A and B are substantially identical in right and left hand formation and are brought together face to face at the single longitudinal and vertical joint or seam 19. Each section consists of a substantially rectangular open frame, comprising the vertical end members 20 and 21 embodying the gear casings 22 and 23 and the upper and lower horizontal members 24 and 25. The frame members are generally curved or U shaped in cross section, the walls of the sections joining together forming inclosures, where needed, for the working parts of the wringer. Suitable strengthening ribs 26, 27, 28 and 29 are provided for the frame members and lugs 30, 31 and 32 are provided at each end of the sections A and B for the rigid fastening together of the sections by means of suitable bolts $30^a$, $31^a$ and $32^a$.

In the gear housings 22 and 23 which are formed at opposite ends of the frame in the vertical members 20 and 21, are mounted bearings 35 and 36 for the upper and lower rolls 37 and 12 respectively. The lower roll bearings 36 are permanently clamped between the walls of the housing and the upper bearings 35 are slidably mounted between these walls and subjected to pressure by coil springs 39 adjustable by threaded thumb screws 40. Suitable gears 41 and 42 within the housing 23 and similar gears (not shown) within the housing 22, are secured to the roll shafts 43 and 13 respectively by which the upper roll 37 is driven. The lower roll 12 is mounted between the lower horizontal frame members 25 of the sections A and B as shown most clearly in Figure 3 and the upper ribs 28 of these members are preferably spaced slightly from the roll to permit the water to pass freely downwards through the opening 44 and are also beveled and rounded downwards at the top to facilitate the passage of the clothes away from the rolls. Between the walls of the upper horizontal section members 24 is mounted a safety release device for the upper roll 37, consisting of a spring holding bar 45, a releasing bar 46 having internally threaded nuts 47 through which the thumb screws 40 are screwed to adjust the tension of the springs 39, a locking lip 48 normally passing under the bolt $30^a$ secured in the frame lugs 30, a locking bar 50 arranged to slide on the releasing bar 46 and a spring controlled releasing handle 51 pivoted to the releasing bar 46 and engaging a slot in the locking bar 50. The working and operating parts of the wringer however form no part of the present invention and are merely referred to in so far as they are related to the construction or assembly of the frame. Lugs are also provided on the frame to support a guide board (not shown) for the clothes or water. It will be seen that the construction of the wringer frame is such that it may be readily formed and pressed out of sheet metal in only two parts and that all the working parts may be inclosed in the housing formed out of the same two parts.

It is also evident that by this simple unit and integral form of frame connecting the opposite bearings of the wringer rolls it is impossible to twist the bearings out of line or otherwise disturb the working parts.

Modifications in the form of the frame and in other details may of course be made without departing from the scope and principle of the invention and I do not therefore confine the claims to the exact details of construction shown.

I claim as my invention:

1. A wringer frame comprising two corresponding metallic members placed face to face, each having vertical end members and integral gear housings and upper and lower horizontal members and bearings for wringer rolls, said frame members also having strengthening ribs and lugs with bolts passing therethrough for securing said frame members together.

2. A wringer frame comprising two corresponding metallic members placed face to face and having vertical end members and integral gear housings, and upper and lower horizontal members, a filler bar interposed between the sections of said upper horizontal member and the lower portion of said vertical end members having bearings for wringer rolls adjacent the lower horizontal member, and said end members having ears in opposing relation and bolts passing therethrough for securing said frame members together.

3. A wringer frame comprising two corresponding metallic members placed face to face, each having vertical end members and integral gear housings and upper and lower horizontal members, said end members having bearings in their lower portions for the wringer rolls, one of said gear housings having a bracket thereon and lugs for mounting said bracket on the casing of a roll driving means.

In witness whereof I have hereunto set my hand this 11th day of May, 1920.

ARTHUR O. HUBBARD.